US005140561A

United States Patent [19]

Miyashita et al.

[11] Patent Number: 5,140,561

[45] Date of Patent: Aug. 18, 1992

[54] METHOD FOR ERASING INFORMATION STORED IN RADIO PAGER

[75] Inventors: Mafumi Miyashita; Shigeo Yoshizawa, both of Tokyo, Japan

[73] Assignee: NEC Corporation, Tokyo, Japan

[21] Appl. No.: 681,308

[22] Filed: Apr. 8, 1991

[30] Foreign Application Priority Data

Apr. 6, 1990 [JP] Japan .................................... 90366
Dec. 19, 1990 [JP] Japan .................................... 412228

[51] Int. Cl.$^5$ ........................ G04B 47/00; H04Q 7/00
[52] U.S. Cl. ................................ 368/10; 340/825.44
[58] Field of Search ........................ 368/10, 107–113; 340/825.44–825.48, 825.5

[56] References Cited

U.S. PATENT DOCUMENTS 4,855,731 8/1989 Yoshizawa et al. ............ 340/825.44
4,940,975 7/1990 Ide et al. ........................ 340/825.44
4,988,991 1/1991 Motegi ............................ 340/825.5
5,030,948 7/1991 Bush .............................. 340/825.44

*Primary Examiner*—Vit W. Miska
*Attorney, Agent, or Firm*—Sughrue, Mion, Zinn, Macpeak & Seas

[57] ABSTRACT

A method for eliminating the troublesome need to select and erase messages one by one which are stored in a memory of a radio pager. A multi-function switch is provided via which the pager can be switched on and off. A controller of the pager determines if each of messages stored in the memory has been retained in the memory for more than a predetermined period of time. Then, a message is erased in the event that one of: (A) the message has been stored in the memory for more than the predetermined time period and the multi-function switch is operated in a manner which changes the on/off status of the pager; and (B) (i) the message has been stored in the memory for more than the predetermined period of time and the pager is in the power on status, or (ii) the message has been stored in the memory for more than the predetermined period of time when the pager is switched on after being switched off.

6 Claims, 4 Drawing Sheets

METHOD FOR ERASING INFORMATION STORED IN RADIO PAGER

BACKGROUND OF THE INVENTION

1. Field of the Invention

The present invention relates generally to a method for erasing information stored in a radio pager, and more specifically to such a method wherein information stored in a pager is subject to erasure when a predetermined time duration elapses after the information is received.

2. Description of the Prior Art

A radio pager which is equipped with a display has proven very popular in that a large amount of data can be transmitted at one calling as compared with an old style pager which alerts a person to call a predetermined phone number merely by means of sound and/or flashing light.

With the advent of recent developments in IC (Integrated Circuit) memory techniques, a large number of messages (viz., information) can be stored in a pager. When the memory capacity is reached, the oldest message is automatically deleted to make room for a fresh message based on a first-in-first-out principle. In this case, a subscriber is able to protect one or more messages, by manipulating a multi-function switch, which the subscriber wishes to retain in the memory. Further, it is known in the art that a subscriber is able to select expendable messages one by one using the multi-function switch and delete the same. The multi-function switch is also utilized to cut a battery power supply to a RF (Radio Frequency) section while continuing to provide a control section, etc. with electrical energy.

However, it is very awkward for a user to select message(s) to be erased using a relatively small sized multi-function switch. This problem is inherently amplified with the increase in memory capacity which permits a large number of messages to be stored.

SUMMARY OF THE INVENTION

It is therefore an object of the present invention to provide a method by which messages which are no longer needed, can easily be deleted without cumbersome manipulation of the above mentioned small multi-function switch.

Another object of the present invention is to provide a method by which a message(s) stored in a pager is erased when a predetermined time duration elapses after the information is received.

In brief, the above objects are achieved by a method for eliminating the troublesome need to select and erase messages one by one which are stored in a memory of a radio pager. A multi-function switch is provided via which the pager can be switched on and off. A controller of the pager determines if each of messages stored in the memory has been retained in the memory for more than a predetermined period of time. Then, a message is erased in the event that one of: (A) the message has been stored in the memory for more than the predetermined time period and the multi-function switch is operated in a manner which changes the on/off status of the pager; and (B) (i) the message has been stored in the memory for more than the predetermined period of time and the pager is in the power on status, or (ii) the message has been stored in the memory for more than the predetermined period of time when the pager is switched on after being switched off.

More specifically a first aspect of the present invention is deemed to come in a method for erasing a message stored in a pager which is provided with a multi-function switch via which the pager can be switched on and off, comprising the steps of: (A) determining if the message has been retained in a memory of the pager for more than a predetermined period of time; (B) erasing the message in the event that one of: (a) the message has been stored in the memory for more than the predetermined time period and the multi-function switch is operated in a manner which changes the on/off status of the pager; and (b) (i) the message has been stored in the memory for more than the predetermined period of time and the pager is in the power on status, or (ii) the message has been stored in the memory for more than the predetermined period of time when the pager is switched on after being switched off.

A second aspect of the present invention is deemed to come in a method for erasing a message stored in a pager which is provided with a multi-function switch via which the pager can be switched on and off, comprising the steps of: (a) initiating time counting when the message is received by the pager; (b) storing a time point of receipt of the message in a memory provided in the pager; (c) checking to see if a predetermined time duration has lapsed after the message is received in the event that the multi-function switch is operated in a manner which changes the on/off status of the pager; and (d) erasing the message if the predetermined time duration has expired.

A third aspect of the present invention is deemed to come in a method for erasing a message stored in a pager which is provided with a multi-function switch via which the pager can be switched on and off, comprising the steps of: (a) initiating time counting when the message is received by the pager; (b) storing a time point of receipt of the message in a memory provided in the pager; (c) checking to see if a predetermined time duration has lapsed after the message is received; and (d) erasing the message if: (i) the message has been stored in the memory for more than the predetermined period of time while the pager is in the switch on status or (ii) the message has been stored in the memory for more than the predetermined period of time when the pager is switched on after being switched off.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 1:
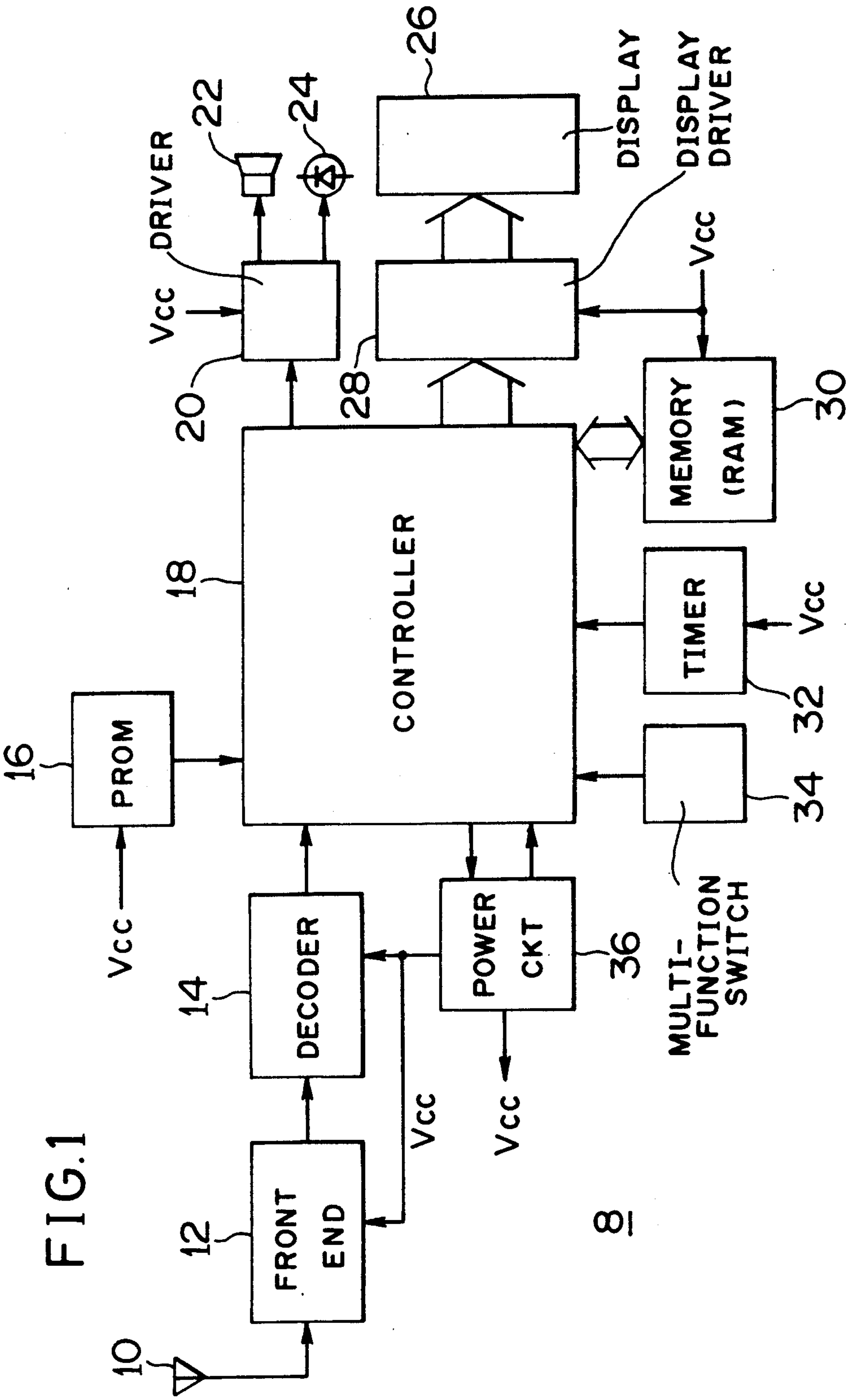
FIG. 1 is a block diagram showing an example of a hardware arrangement (pocket pager) to the which the present invention can be applied.

FIG. 1 shows schematically an arrangement of a pager 8 to which the present invention is applicable.

A front end 12 is provided for amplifying and demodulating a code-modulated carrier wave received by an antenna 10. The front end 12 is a conventional circuit arrangement comprised of a high frequency amplifier, a frequency converter, an IF amplifier, and a discriminator. The output of the front end 12 is applied to a decoder 14 which decodes the output applied thereto into the corresponding baseband signal. A controller 18 is provided with a CPU (Central Processing Unit (not shown)) which controls the overall operations of the pager 8 using the program stored in a ROM (Read Only Memory (not shown)) provided in the controller 18. The controller 18 is supplied with the output of the decoder 14 and searches for an identifying address code by comparing the same with a subscriber's unique code prestored in a PROM (Programmable Read Only Memory) 16.

In the event that the identifying address code coincides with the subscriber's unique code, the controller 18 activates a driver 20 which in turn operates one or both of a speaker 22 and a light source (LED for example) 24 for alerting the subscriber. Further, the controller 18 exhibits the message included in the just received calling signal on a display 26 through a driver 28. Still further, a memory (RAM: Random Access Memory) 30 stores, under the control of the controller 18, the message together with a time point of the reception thereof using a timer 32.

As in a known pager, a multi-function switch 34 is arranged to perform a plurality of functions or purposes. That is to say, the switch 34 is used to: (a) halt the operations of the speaker 22 and the light source 24, (b) selectively display one of the messages stored in the memory 30, (c) selectively protect selected messages in order to prevent the same from being erased carelessly, (d) selectively erase the messages stored, (e) terminate a power supply to the front end 12 and the decoder 14 from a battery included in a power circuit 36, etc. It goes without saying that these operations of the switch 34 are performed under the control of the controller 18. The power circuit 36 supplies the various blocks of FIG. 1 with a power source Vcc as shown.

First and second embodiments of the present invention will be discussed with reference to FIGS. 1 through 4.

Figure 2:
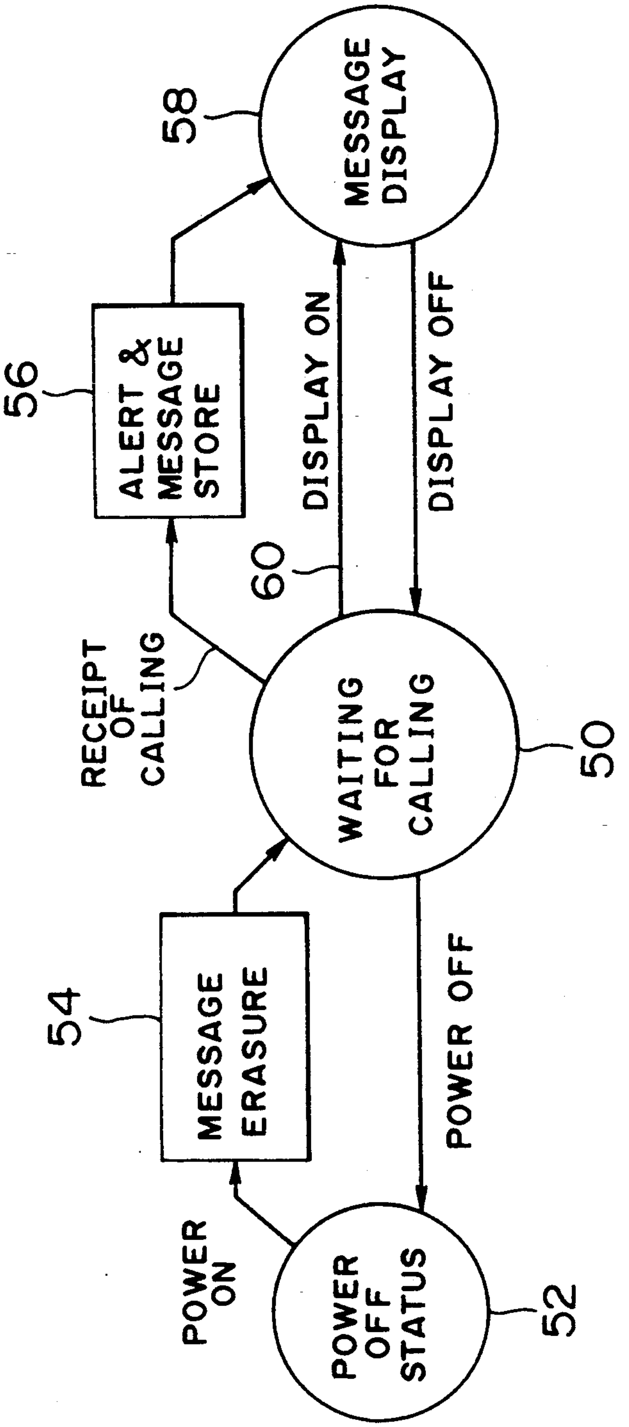
FIG. 2 is a sketch showing the transition of operation modes of the pager for discussing a first embodiment of the present invention.

FIG. 2 is a sketch showing the transition of operation modes of the pager 8 (FIG. 1) according to the first preferred embodiment of the present invention. Terms "power on" and "power off" imply that power supply to the blocks 12, 14 is respectively established and terminated in response to a control signal applied to the power circuit 36. In this case, it should be noted that each of the other blocks 16, 20, 28, 30 and 32 are still supplied with the power source Vcc.

Merely for the convenience of discussion, it is assumed that: (a) the blocks 12, 14 are energized and hence the pager 8 (FIG. 1) is in a call waiting mode 50, (b) a plurality of messages (denoted A, B, C, D, . . . , M and N) have been stored in the memory 30, (c) the messages A, B, C and D have been retained in the memory 30 for more than a predetermined period of time (one week merely by way of example) and (d) the message B has been protected and shall not been deleted without the subscriber's intentional manipulation of the switch 34.

When a subscriber turns the switch 34 to the "power off" position (changed to an operation mode 52) and subsequently to the "power on" position, the messages A, C and D are automatically erased in the memory 30 at a mode 54 in that they are retained for more than the predetermined period of time and have not been protected. Thereafter, the pager 8 returns to the operation mode 50. It should be noted that the message B is not erased since it has been protected as previously mentioned. Thus, a subscriber is able to simultaneously delete a plurality of the messages each of which is held in the memory 30 for more than the predetermined period of time.

When the pager 8 is in the call waiting mode 50 and receives a calling directed thereto, the controller 18 alerts the subscriber and stores the message together with a time point of the message receipt at an operation mode 56. Following this, the pager 8 goes to an operation mode 58 at which the just received message is exhibited at the display 26 for a preset time duration. A subscriber is able to selectively display the message stored in the memory 30 using the multi-function switch 34 while the pager 8 is in the mode 50, as indicated by a line 60. The message display disappears when the above-mentioned preset time duration expires. As an alternative, a subscriber is capable of wiping out the message from the display 26 by manipulating the multi-function switch 34. These operations are not directly concerned with the present invention and hence further descriptions thereof will be omitted for the sake of brevity.

Figure 3:
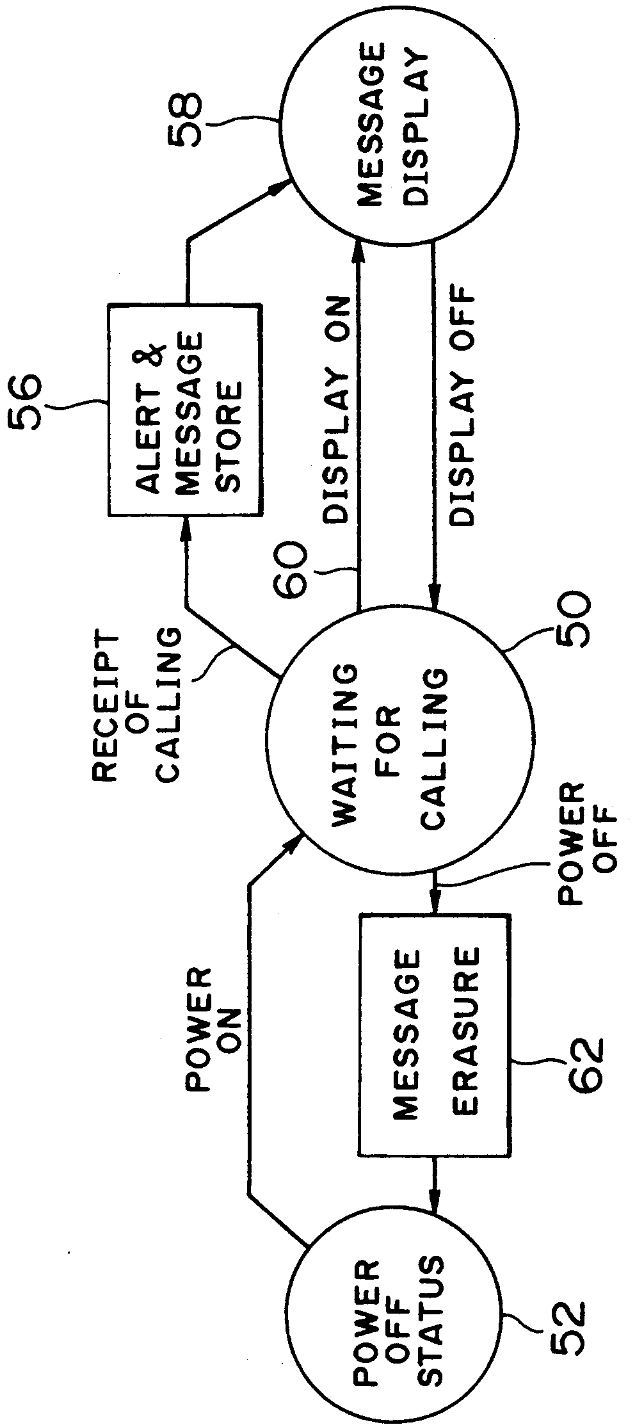
FIG. 3 is a sketch which is similar to FIG. 2 and is represented for describing a variant of the first embodiment.

FIG. 3 is a sketch showing a variant of the first embodiment wherein the message erasure is implemented at an operation mode 62 immediately after the power supply to the blocks 12, 14 is cut. The remainings are exactly the same as in the first embodiment so that further discussions will be neglected for simplicity.

Figure 4:
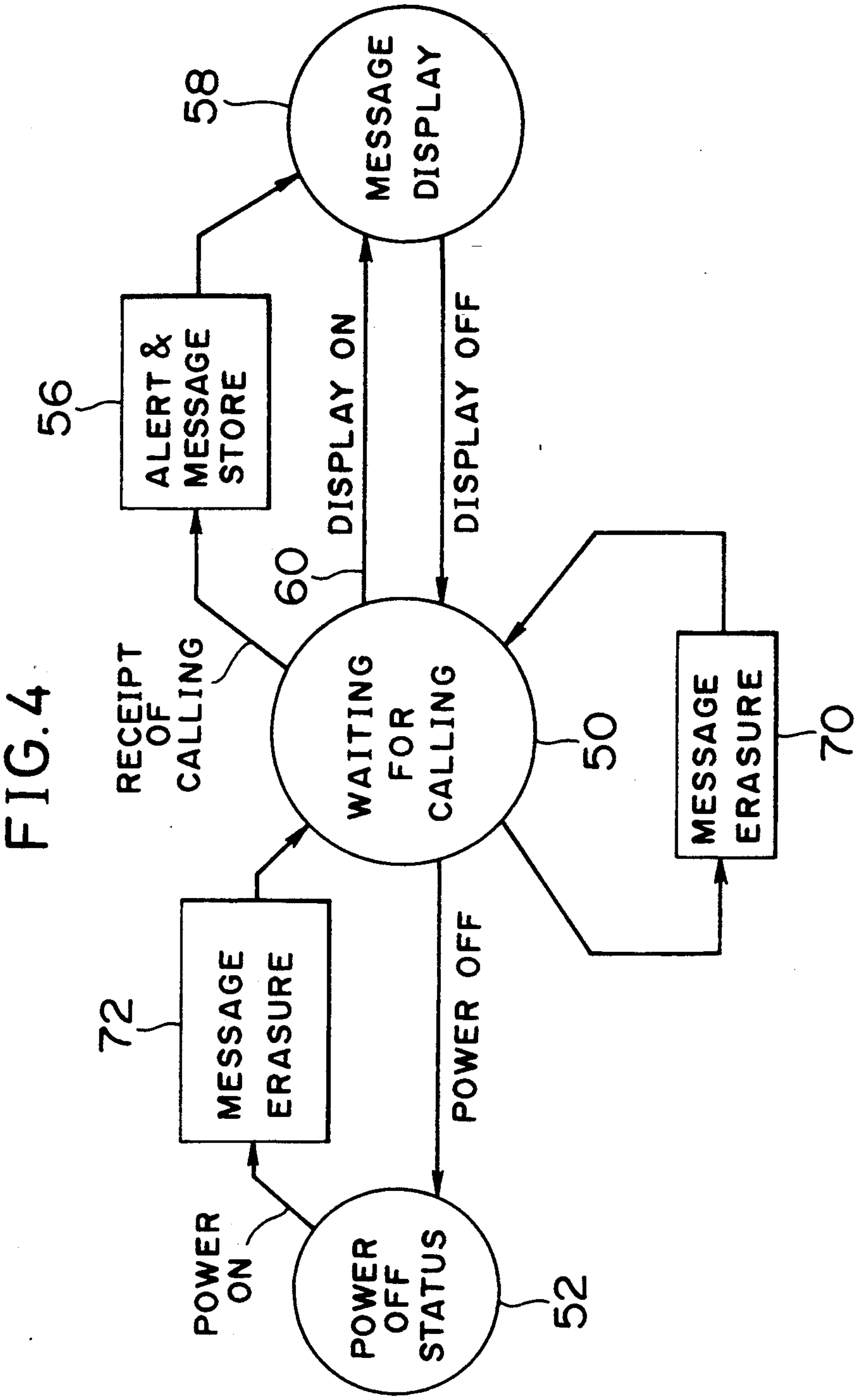
FIG. 4 is a sketch showing the transition of operation modes of the pager for discussing a second embodiment of the present invention.

FIG. 4 is a sketch showing the transition of operation modes of the pager according to the second embodiment of the present invention.

Merely for the convenience of discussion, it is assumed that: (a) the blocks 12, 14 are energized and hence the pager 8 is in the call waiting mode 50, (b) a plurality of messages (denoted A', B', C', D', . . . , M' and N') have been stored in the memory 30, and (c) the message B' has been protected and shall not been deleted without the subscriber's intentional manipulation of the switch 34.

It is further assumed that the message A' has been retained in the memory 30 for more than a predetermined period of time (one week merely by way of example). In this instant, the message A' is automatically erased from the memory. That is to say, if the pager 8 is in the power on status (mode 50) and a given message has been stored in the memory 30 for the predetermined period of time, then the message in question is subject to erasure without waiting for any manipulation of the multi-function switch 34 (mode 70). In order to implement this operation, it is necessary to check to see, at a predetermined time interval, if each of the messages stored in the memory 30 is held for more than the predetermined time period.

On the other hand, if the message A' is not retained in the memory 30 up to the predetermined period of time and the pager 8 is switched off, the pager 8 checks to see, when subsequently switched on, if the memory A' is retained for more than the predetermined time period (mode 72). In the event that the message A' is held for more than the predetermined time period, then it is erased at mode 72 after which the pager 8 enters into the call waiting mode 50. It should be noted that the time counting in connection with each of the messages stored in the memory 30 proceed even while the pager is switched off.

In the above description of the first embodiment, the time counting can be terminated while the pager is switched off.

While the foregoing description describes only two embodiments of the present invention, the various alternatives and modifications possible without departing from the scope of the present invention, which is limited only by the appended claims, will be apparent to those skilled in the art.

What is claimed is:

1. A method for erasing a message stored in a pager which is provided with a multi-function switch via which the pager can be switched on and off, comprising the steps of:

(A) determining if the message has been retained in a memory of the pager for more than a predetermined period of time;

(B) erasing the message in the event that one of:

(a) the message has been stored in the memory for more than the predetermined time period and the multi-function switch is operated in a manner which changes the on/off status of the pager; and (b) (i) the message has been stored in the memory for more than the predetermined period of time and the pager is in the power on status, or (ii) the message has been stored in the memory for more than the predetermined period of time when the pager is switched on after being switched off.

2. A method as claimed in claim 1, wherein the message can be protected by operating the multi-function switch and, the message is preserved in the memory in steps (A) and (B) if the message has been protected.

3. A method for erasing a message stored in a pager which is provided with a multi-function switch via which the pager can be switched on and off, comprising the steps of:

(a) initiating time counting when the message is received by the pager;

(b) storing a time point of receipt of the message in a memory provided in the pager;

(c) checking to see if a predetermined time duration has lapsed after the message is received in the event that the multi-function switch is operated in a manner which changes the on/off status of the pager; and (d) erasing the message if the predetermined time duration has expired.

4. A method as claimed in claim 3, wherein the message can be protected by operating the multi-function switch and, the message is preserved in the memory in step (d) if the message has been protected.

5. A method for erasing a message stored in a pager which is provided with a multi-function switch via which the pager can be switched on and off, comprising the steps of:

(a) initiating time counting when the message is received by the pager;

(b) storing a time point of receipt of the message in a memory provided in the pager;

(c) checking to see if a predetermined time duration has lapsed after the message is received; and (d) erasing the message if: (i) the message has been stored in the memory for more than the predetermined period of time while the pager is in the switch on status or (ii) the message has been stored in the memory for more than the predetermined period of time when the pager is switched on after being switched off.

6. A method as claimed in claim 5, wherein the message can be protected by operating the multi-function switch and, the message is preserved in the memory in steps (d) if the message has been protected.

* * * * *